(12) United States Patent
Cai et al.

(10) Patent No.: US 8,309,154 B2
(45) Date of Patent: Nov. 13, 2012

(54) AERATED FOOD PRODUCT WITH SURFACE-ACTIVE INORGANIC FIBERS

(75) Inventors: Ya Cai, Shanghai (CN); Jian Cao, Shanghai (CN); Matthew Duncan Golding, Werribee (AU); Weichang Liu, Shanghai (CN); Vesselin Nikolaev Paunov, Hull (GB); Edward George Pelan, AT Vlaardingen (NL); Simeon Dobrev Stoyanov, AT Vlaardingen (NL); Weizheng Zhou, Shanghai (CN)

(73) Assignee: Conopco, Inc., Englewood Cliffs, NJ (US)

( * ) Notice: Subject to any disclaimer, the term of this patent is extended or adjusted under 35 U.S.C. 154(b) by 783 days.

(21) Appl. No.: 12/086,095

(22) PCT Filed: Nov. 22, 2006

(86) PCT No.: PCT/EP2006/011382
§ 371 (c)(1),
(2), (4) Date: Jul. 22, 2009

(87) PCT Pub. No.: WO2007/068344
PCT Pub. Date: Jun. 21, 2007

(65) Prior Publication Data
US 2009/0306223 A1 Dec. 10, 2009

(30) Foreign Application Priority Data
Dec. 16, 2005 (EP) ..................................... 05077906

(51) Int. Cl.
*A23L 1/00* (2006.01)
*A23L 1/035* (2006.01)
*A23L 1/308* (2006.01)
*B01F 17/00* (2006.01)

(52) U.S. Cl. ........ 426/564; 426/565; 426/567; 426/589; 426/590; 428/378; 428/400; 428/401; 514/769; 514/781; 516/11

(58) Field of Classification Search ........................ None
See application file for complete search history.

(56) References Cited

U.S. PATENT DOCUMENTS

| | | | |
|---|---|---|---|
| 3,809,764 A | 5/1974 | Gabby et al. | |
| 3,968,266 A | 7/1976 | Baugher | |
| 4,154,863 A | 5/1979 | Kahn et al. | |
| 4,612,852 A | 9/1986 | Price et al. | |
| 4,631,196 A | 12/1986 | Zeller | |
| 4,770,892 A | 9/1988 | Grealy et al. | |
| 4,793,279 A | 12/1988 | Grenier | |
| 4,828,854 A | 5/1989 | Beer | |
| 5,000,974 A | 3/1991 | Albersmann | |
| 5,004,623 A | 4/1991 | Giddey et al. | |
| 5,395,877 A | 3/1995 | Pucknat et al. | |
| 5,493,957 A | 2/1996 | Kennedy et al. | |
| 5,605,712 A | 2/1997 | Bertrand et al. | |
| 5,658,377 A * | 8/1997 | Craig ........................ | 106/162.1 |
| 5,789,004 A | 8/1998 | Hogan et al. | |
| 5,800,604 A | 9/1998 | Berger | |
| 6,177,103 B1 | 1/2001 | Pace et al. | |
| 6,241,812 B1 | 6/2001 | Smith et al. | |
| 6,326,046 B1 | 12/2001 | Tucker et al. | |
| 6,497,913 B1 | 12/2002 | Gray et al. | |
| 6,677,318 B1 | 1/2004 | Beisel | |
| 2003/0078172 A1 | 4/2003 | Guiramand et al. | |
| 2003/0175317 A1 * | 9/2003 | Barthel et al. ............... | 424/401 |
| 2004/0185162 A1 | 9/2004 | Finnigan et al. | |
| 2005/0137115 A1 | 6/2005 | Cole et al. | |
| 2005/0222082 A1 | 10/2005 | Beisel | |
| 2005/0266992 A1 * | 12/2005 | Ohno et al. ................... | 502/439 |
| 2006/0063882 A1 * | 3/2006 | Velev et al. ................... | 524/543 |

FOREIGN PATENT DOCUMENTS

| | | |
|---|---|---|
| DE | 19617568 | 12/1997 |
| EP | 0292034 | 11/1988 |
| EP | 0348503 B1 | 1/1990 |
| EP | 0930017 A1 | 7/1999 |
| EP | 1295594 A1 | 3/2003 |
| EP | 1582105 A1 | 10/2005 |
| GB | 2377155 A | 1/2003 |
| JP | 60099333 | 6/1985 |
| JP | 2002161161 | 6/2002 |
| KR | 950006071 | 6/1995 |
| WO | WO0106865 A1 | 2/2001 |
| WO | WO2004017746 A1 | 3/2004 |
| WO | WO 2005/082507 | 9/2005 |
| WO | WO2006007393 | 1/2006 |
| WO | WO2006067064 A1 | 6/2006 |
| WO | WO2007068344 A1 | 6/2007 |

OTHER PUBLICATIONS

Wu et al., SU-8 Hydrophilic Modification by Forming Copolymer with Hydrophilic Epoxy Molecule, 7th International Conference on Miniaturized Chemical and Biochemical Analysis Systems, pp. 1117-1120 (2003).*

Noble et al., Fabrication of "Hairy" Colloidosomes with Shells of Polymeric Microrods, Journal of the American Chemical Society, 126: 8092-8093 (2004).*

Watson et al., The Effect of Solvent and Fiber Treatment on the Deposition of Organic Silane Solutions Using THF and Acetone, Journal of Colloid and Interface Science, 241: 32-44 (2001).*

(Continued)

*Primary Examiner* — Daniel Sullivan
*Assistant Examiner* — Lisbeth C Robinson
(74) *Attorney, Agent, or Firm* — Michael P. Aronson

(57) ABSTRACT

There is provided a surface-active material that comprises fibers which have been modified so as to impart surface-active properties onto said fibres and giving it a contact angle between 60° and 120°, wherein the fibres have an aspect ratio of more than 10 to 1,000. The surface-active material can be used for foam and emulsion formation and stabilization, coatings, encapsulation and drug delivery. It can for example be used in the following industries: foods, home and personal care, oilfield, agriculture, textile, construction, emulsion polymerization, leather, plastic, pulp, paper and pharma.

6 Claims, No Drawings

OTHER PUBLICATIONS

Pollack, The Dow Chemical Company, Midland, MI (1997).*
Extended European Search Report dated Aug. 4, 2010.
European Search Report Application No. EP 05077906 dated Jun. 1, 2006.
International Search Report International Application No. PCT/EP2006/011382 dated Feb. 2, 2007.
Alargova et al., "Foam Superstabilization by Polymer Microrods", vol. 20, 2004, pp. 10371-10374, XP002377655.
Paunov, "Novel Method for Determining the Three-Phase Contact Angle of Colloid Particles Adsorbed at Air0Water and Oil-Water Interfaces", Langmuir, vol. 19, 2003, pp. 7970-7976, XP002377711.
Ramsden, "Separation of Solids in the Surface-layers of Solutions and 'Suspensions' (Observtions on Surface-membranes, Bubbles, Emulsions, and Mechanical Coagulation)—Preliminary Account", W. Proc., Royal Society of London, 1903, 72, pp. 156-164.
Binks, "Particles as surfactants—similarities and differences", Current Opinion Colloid Interface Sci., 2002, 7, pp. 21-41.
National Starch, Dry-Flo, Technical Service Bulletin, Food Innovation.
Dry-Flo Trademark, Trademark Electronic Search System TESS, First Use IN Commerce 19500101, Mar. 9, 2004.
Cellulose Processing, Executive Summary, Sep. 28, 2001, pp. 1-17, NOSB Tap Review.
Alargova et al., Formation of Polymer Microrods in Shear Flow by Emulsification-Solvent Attrition Mechanism, Langmuir, 2006, pp. 765-775.
Alargova et al., Scalable Synthesis of a New Class of Polymer Microrods by a Liquid-Liquid Dispersion Technique, Advanced Materials, 2004, vol. 16, No. 18, pp. 1653-1657, Wiley-VCH Verlag GmbH & Co., Weinheim.
Arbuckle, Ice Cream 2nd Ed 1972 pp. 35 266 284-285.
Combes et al., Supercritical Fluid Processes, H1839, Feb. 1, 2000, pp. 1-5.
Iijima et al., Microcrystalline cellulose: an overview, Handbook of Hydrocolloids, 2000, Ch 19, pp. 1-16.
Lewis, Carboxymethylcellulose, Hawley's Condensed Chemical Dictionary, 15th Ed, 2007, p. 238, John Wiley & Sons.
Rolls, 2000, Increasing the volume of a food by incorporating air effects satiety in men, Am. J. Clin. Nutr., 72, pp. 361-368, American Society for Clinical Nutrition.
Rousseau et al., Stabilization of water-in-oil emulsions with continuous phase crystals, Colloids and Surfaces, A Physicochem Eng Aspects, 2005, vol. 260, pp. 229-237, Elsevier B.V.
Wansink, Bottomless Bowls: Why Visual Cues of Portion Size May Influence Intake, Obesity Research, 2005, vol. 13, p. 93.
Whitesides et al., Self-Assembly at All Scales, Science, 2002, vol. 295, pp. 2418-2421.
Aqualon CMC brochure, pp. 2 and 11.
Aqualon Hydroxypropylcellulose brochure, pp. 2 and 7.
Co-pending application Blijdenstein et al., U.S. Appl. No. 12/445,582, filed Apr. 15, 2009.
Co-pending application Blijdenstin et al., U.S. Appl. No. 12/445,583, filed Apr. 15, 2009.
Co-pending application Berry et al., U.S. Appl. No. 12/445,592, filed Apr. 15, 2009.
Co-pending application Blijdenstein et al., U.S. Appl. No. 12/445,579, filed Apr. 15, 2009.
Co-pending application Cox et al., U.S. Appl. No. 12/445,478, filed Apr. 14, 2009.

* cited by examiner

AERATED FOOD PRODUCT WITH SURFACE-ACTIVE INORGANIC FIBERS

FIELD OF THE INVENTION

The invention relates to a new surface-active material and its applications in the area of foam and emulsion formation and stabilisation, coatings, encapsulation and drug delivery. More in particular, it relates to a surface-active material that comprises surface-active fibres and to a method for preparing said surface-active material, as well as to products comprising said surface-active material.

BACKGROUND TO THE INVENTION

A surface-active agent or surfactant is a substance that lowers the surface tension of the medium in which it is dissolved, and/or the interfacial tension with other phases. Accordingly, it is positively adsorbed at the liquid/vapour and/or at other interfaces.

Surface-active agents are widely used industry, for instance in foods, cleaning compositions and personal care products. In foods, they are used to achieve emulsions of oily and water-phases, such as in fat spreads or mayonnaise. In laundry cleaning applications, they are used to solubilise dirt and keep it is solution, so that it can be effectively removed from the fabric.

For cleaning applications, the surface-active compounds may be chosen from anionic, cationic, nonionic, amphoteric and zwitterionic surfactants. Many suitable surface-active compounds are available and are fully described in the literature, for example, in "Surface-Active Agents and Detergents", Volumes I and II, by Schwartz, Perry and Berch.

The most commonly used detergent-active compounds are soaps and synthetic non-soap anionic and nonionic compounds. Examples of anionic surfactants include alkylbenzene sulphonates, particularly linear alkylbenzene sulphonates having an alkyl chain length of C8-C15; primary and secondary alkylsulphates, particularly C8-C15 primary alkyl sulphates; alkyl ether sulphates; olefin sulphonates; alkyl xylene sulphonates; dialkyl sulpho-succinates; and fatty acid ester sulphonates. Sodium salts are generally preferred.

Examples of nonionic surfactants include the primary and secondary alcohol ethoxylates, especially the $C_8$-$C_{20}$ aliphatic alcohols ethoxylated with an average of from 1 to 20 moles of ethylene oxide per mole of alcohol, and more especially the $C_{10}$-$C_{15}$ primary and secondary aliphatic alcohols ethoxylated with an average of from 1 to 10, preferably 3 to 7 moles of ethylene oxide per mole of alcohol. Non-ethoxylated nonionic surfactants include alkylpolyglycosides, glycerol monoethers, and polyhydroxy-amides (glucamide).

The choice of the surface-active material (surfactant), and the amount present, will depend on the intended use of the detergent composition. For fabric washing compositions, different surfactant systems may be chosen, as is well known to the skilled formulator, than for handwashing products or mechanical dishwashing products.

In foods, surface-active materials are commonly used to prepare emulsions. Edible emulsions are used as a base for many types of food products. Mayonnaise compositions, for example, comprise edible oil-in-water emulsions that typically contain between 80 to 85% by weight oil, and egg yolk, salt, vinegar and water. Mayonnaise compositions are enjoyed by many consumers, and particularly, on sandwiches, in dips, with fish and other food applications. The oil present in the edible emulsions used in such food products is generally present as droplets dispersed in the water phase. In addition to droplet size and the amount of droplets dispersed, the close packing of the oil droplets results in the characteristic Theological behaviour of the emulsions used to make the desired food product, such as mayonnaise or margarine.

The surface-active agents that are most commonly used in food applications comprise low molecular weight emulsifiers that are primarily based on fatty acid derivatives. Examples include: lecithin's, monoglycerides (saturated and unsaturated), polysorbate esters (Tweens), sorbitan esters (Spans), polyglycerol esters, propylene glycol monostearate, sodium and calcium stearoyl lactylates, sucrose esters, organic acid (lactic, acetic, tartaric, succinic) esters of monoglycerides. Proteins and other surface-active biopolymers can also be used for this purpose. Typical examples of food proteins include milk proteins (caseins and whey proteins), soy protein, egg protein, lupin protein, pea protein, wheat protein. Examples of other surface-active biopolymers include gum Arabic, modified surface active pectin and OSA modified starch.

Recently, the interest in the study of solid particles as emulsifiers of dispersed systems has been re-awakened. Much of this activity has been stimulated by the research of Binks and co-workers (Binks, B. P. Curr. Opin. Colloid Interface Sci. 2002, 7, 21), though the principles of such stabilisation were observed at least 100 years ago (Ramsden, W. Proc. R. Soc. London 1903, 72, 156). The advantage of particle stabilisation is that it is almost impossible to displace an adsorbed particle once adsorbed to an interface. This gives particle stabilised emulsions and foams excellent stability, especially with respect to ripening mechanisms such as disproportionation.

Whilst the use of particles to stabilise o/w, w/o and duplex emulsions and foams has been amply demonstrated in recent years, much less research has been carried out on non-spherical structures with respect to the stabilisation of interfaces. Furthermore, it has recently been demonstrated by Alargova et. al. (Langmuir, 2004, 20, 10371), that epoxy rods can be used to provide interfacial stabilisation to emulsions and foams.

Notwithstanding the fact that many surface-active materials are known and available, there is a continuous need for new alternative or improved surface-active materials, especially environmentally friendly surface-active materials having good biodegradability properties. It is therefore an object of the present invention to provide such surface-active materials. It is a further object to provide surface-active materials that are useful in the stabilisation of emulsions and foams.

Surprisingly, it has now been found that one or more of the above-mentioned objects can be achieved by the surface-active material according to the invention, which is characterised in that it comprises fibres which have been modified so as to impart surface-active properties onto said fibres and giving it a contact angle between 60° and 120°.

The present inventors have found that the shape and size are of critical importance for the colloidal stability of foams and emulsions. Rod like (fibril) shapes are much more efficient then spherical particles. Another key factor for good foam and emulsion stabilisation is particle contact angle at oil/water or air/water interface, which must be as close to 90° as possible. The rod-like structures must therefore be amphiphathic in design (o/w and w/o stabilisation depends on the relative balance between hydrophobicity and hydrophilicity).

Rod- and fibre-like structures such as microcrystalline cellulose (MCC) and natural plant fibres have been used in food systems. Such structures often find application as bulk structuring agents, providing a contribution to the rheology of a formulation, without showing a tendency to adsorb at interfaces or exhibiting surface-active properties.

SUMMARY OF THE INVENTION

According to a first aspect, the invention provides a surface-active material that which is characterised in that it comprises fibres which have been modified so as to impart surface-active properties onto said fibres and giving it a contact angle between 60° and 120°, wherein the fibres have an aspect ratio of more than 10 to 1,000.

According to a second aspect, there is provided a process for preparing such a surface-active material.

According to a third aspect, there is provided a product comprising said surface-active material for the purpose of foam and emulsion formation and stabilisation, coatings, encapsulation and drug delivery. The fourth aspect involves the application of said surface-active material in home and personal care, foods, oilfield, agriculture, textile, construction, emulsion polymerisation, leather, plastic, pulp, paper and pharma.

DETAILED DESCRIPTION OF THE INVENTION

In its first aspect, the invention relates to a surface-active material comprising natural fibres that have been modified. By the word "fibre", we mean any structure, especially an insoluble, particulate structure, wherein the ratio between the length and the diameter ranges from 10 to infinite. Here, the diameter means the largest distance of the cross-section. The materials of the "fibre" substance can be organic, inorganic, polymeric and macromolecular. The fibre topology might be liner or branched (star-like). The aspect ration in this case is defined as aspect ratio of the longest branch.

The fibres used in the present invention have a length of 0.1 to 100 micrometer, preferably from 1 to 50 micrometer. Their diameter is in the range of 0.01 to 10 micrometer. The aspect ratio (length/diameter) is generally more than 10, preferably more than 20 up to 1,000.

The fibres may be of organic or inorganic origin. In particular, organic, natural fibres made of a crystalline, insoluble form of carbohydrates, such as microcrystalline cellulose, can be used. Such fibres have the advantage that they are very biodegradable, which is favourable for the environment. Very often organic fibres are also food-grade. One example of a suitable source is the microcrystalline cellulose obtainable from *Acetobacter*. Other examples are citrus fibres, onion fibres, silk, stearic acid, polyhydroxybutyrate-valerate, PVP (polyvinyl pyrrolidone), PCL (polycaprolactone), their derivatives and copolymers, and other polymers that can be spun with diameter ranging from 0.01 to 30 micrometers.

Examples of inorganic fibres are $CaCO_3$, $CaSO_4$, ZnO, $TiO_2$, MgO, $MgSO_4$, $Mg(OH)_2$, $Mg_2B_2O_5$, aluminium borate, potassium titanate, barium titanate, hydroxyapatite, attapulgite, but other inorganic crystals with fibre-like morphology could also be used.

The fibres that are used in the present invention are not used as such, but in modified form. As a consequence of the modification, the contact angle is modified such that is in the range of between 60° and 120°, preferably between 70° and 110°, more preferably between 80° and 100°. By contact angle we mean the three-phase contact angle at the fibre/air/water interface or the fibre/oil/water interface, depending on the type product in which the surface-active material of the present invention is used. For foams this will be the fibre/air/water contact angle, for emulsions, the fibre/oil/water contact angle.

The contact angle can be measured using the gel-trapping technique as described by technique as described by Paunov (Langmuir, 2003, 19, 7970-7976) or alternatively by using commercial contact angle measurement apparatus such as the Dataphysics OCA20.

The modification of the fibres can be achieved by chemical or physical means. The chemical modification involves esterification or etherification, by means of hydrophobic groups, such like stearate and ethoxy groups, using well-known techniques. The physical modification includes coating of the fibres with hydrophobic materials, for example ethylcellulose or hydroxypropyl-cellulose. One can also use waxes, such as shellac, carnauba or bees wax. Fat and fatty acids such as stearic acid may also be used. The coating can be done using colloidal precipitation using solvent or temperature change, for instance. The physical modification may also involve "decoration" of rod like materials using hydrophobic nano-particles, for instance silica.

According to the invention, one can use the process of controlled esterification of Microcrystalline cellulose (Antova et. al, Carbohyd. Polym., 2004, 57 (2), 131) as possible route for controlled hydrophobicity modification and therefore obtaining particles with surface-active properties. Based on this principle, it will be understood that the skilled person can easily find other routes to modify the hydrophobicity of other types of fibres of organic or inorganic origin.

According to another aspect of the present invention, there is provided a surface-active material, obtainable by modification of fibres so as to impart surface-active properties onto said fibres and giving it a contact angle between 60° and 120°, wherein the fibres have an aspect ratio of more than 10 to 1,000.

Possible applications for the surface-active materials of the present invention are in the area of foam and emulsion formation and stabilisation, for instance as foam stabilisers for ice cream, as emulsion stabilisers for mayonnaise or margarine, as foam formation agent and stabiliser for home and personal care products such as toothpaste, and as flotation agent, for instance in the mining industry. They may also be used for coatings, encapsulation and drug delivery.

The industries where these surface-active materials of the present invention could be applied include home and personal care, foods, oil industry, agriculture, textile, construction, polymer industry (emulsion polymerisation), leather, plastic, pulp, paper and pharma.

The invention will now be further illustrated by means of the following non-limiting examples.

EXAMPLE 1

In a 50-ml beaker, 0.05 g ethyl cellulose (EC, Aldrich product, viscosity: 10 cps) was added into 20 ml of acetone. Then under ultrasonication (Branson Ultrasonics Corporation, 5510E-DTH) and magnetic stirring (IKA, RCT basic), the ethyl cellulose gradually dissolved to form a homogenous solution. Next 0.2 g of Microcrystalline cellulose (MCC, rod-like, Diameter: ~20 nm, Length: several to tens of microns) was added into the system and ultrasonication was applied for 10 minutes to induce the homogenous dispersion of the MCC. As a non-solvent of ethyl cellulose, 10 ml of water was dropped into the above system to induce coacervation of ethyl cellulose, during which the coacervated ethyl cellulose particles were attached to MCC fibers. Subsequently, the acetone was completely removed by stirring or under reduced pressure at an elevated temperature. The obtained MCC/ethyl cellulose water dispersion was used to investigate the foamability and foam stability. The foams were prepared at room temperature by hand-shaking for a period of 40 s. The foams stabilized by this material are stable at ambient conditions for more than two weeks.

EXAMPLE 2

4.0 g of rod-like $CaCO_3$ (provided by Qinghai Haixing Science and Technology Development Co., Ltd, China, Diameter: ~2 microns, Length: ~50 microns) was dispersed into 40 ml acetone solution containing 0.20 g of ethyl cellulose (EC, Aldrich product, viscosity: 10 cps). Ultrasonication (Branson Ultrasonics Corporation, 5510E-DTH) was used for 10 minutes to induce the homogenous dispersion of the $CaCO_3$. Then 160 ml of water was quickly poured into the dispersion to make the ethyl cellulose deposit fast on the surface of $CaCO_3$ particles. After magnetic stirring (IKA, RCT basic) for 2 minutes, the dispersion was filtrated, and the filter cake was immediately dried in vacuum oven at 80° C. Finally $CaCO_3$/ethyl cellulose composite was obtained. Then the powder was put into water to investigate foamability and foam stability. The foams were prepared at room temperature by hand-shaking for a period of 40 s. The foams stabilized by these materials are stable for more then one month. The initial volume of the foam linearly increased with the amount of material added. It is interesting to note that initial foam volume of the foams stabilized by these materials passes trough a maximum at a ratio of EC:CaCO3 of about 1:20 (which was chosen in this example).

EXAMPLE 3

4.0 g of rod-like ZnO (tetrapod-like, provided by Chengdu Advanced Technologies and Crystal-Wide Co., Ltd, China, Diameter: ~2 microns, Length: several tens of micron) was dispersed into 40 ml of acetone solution containing 0.20 g of ethyl cellulose (EC, Aldrich product, viscosity: 10 cps). Ultrasonication (Branson Ultrasonics Corporation, 5510E-DTH) was used for 10 minutes to induce the homogenous dispersion of the ZnO. Then 160 ml of water was quickly poured into the dispersion to make ethyl cellulose deposit fast on the surface of ZnO particles. After magnetic stirring (IKA, RCT basic) for 2 minutes, the dispersion was filtrated, and the filter cake was immediately dried in vacuum oven at 80° C. Finally, a ZnO/ ethyl cellulose composite was obtained. Then the powder was put into water to investigate foamability and foam stability. The foams were prepared at room temperature by hand-shaking for a period of 40 s. The foams stabilized by this material are stable at ambient conditions for more than two weeks.

The invention claimed is:

1. Food product comprising a surface-active material that comprises inorganic fibres which have been modified by physical means so as to impart surface-active properties onto said fibres and giving said modified fibres a three-phase contact angle at a fibre/air/water interface or the fibre/oil/water interface between 60° and 120°, wherein the fibres have an insoluble, particulate structure, wherein the fibres have an aspect ratio of more than 10 to 1,000, and wherein physical modification includes coating of the fibres with hydrophobic materials or involves decoration of inorganic fibres using hydrophobic nano-particles, wherein the hydrophobic materials or nano-particles comprise ethylcellulose, wherein the food product is an aerated product.

2. The food product according to claim 1, wherein the modified fibres have a contact angle between 70° and 110°.

3. The food product according to claim 1, wherein the fibres have a length of 0.1 to 100 micrometer.

4. The food product according to claim 1, wherein the fibres are selected from the group consisting of $CaCO_3$, $CaSO_4$, ZnO, $TiO_2$, MgO, $MgSO_4$, $Mg(OH)_2$, $Mg_2B_2O_5$, aluminium borate, potassium titanate, barium titante, hydroxyapatite and attapulgite.

5. Food product according to claim 1, wherein the aerated food product is in the form of a liquid product selected from the group consisting of sauces, soups and drinks.

6. Food product according to claim 1, wherein the aerated food product is selected from the group consisting of foams, mousses and ice cream.

* * * * *